June 22, 1937.  E. H. BRAYER  2,084,317
METER
Filed May 2, 1934   4 Sheets-Sheet 2
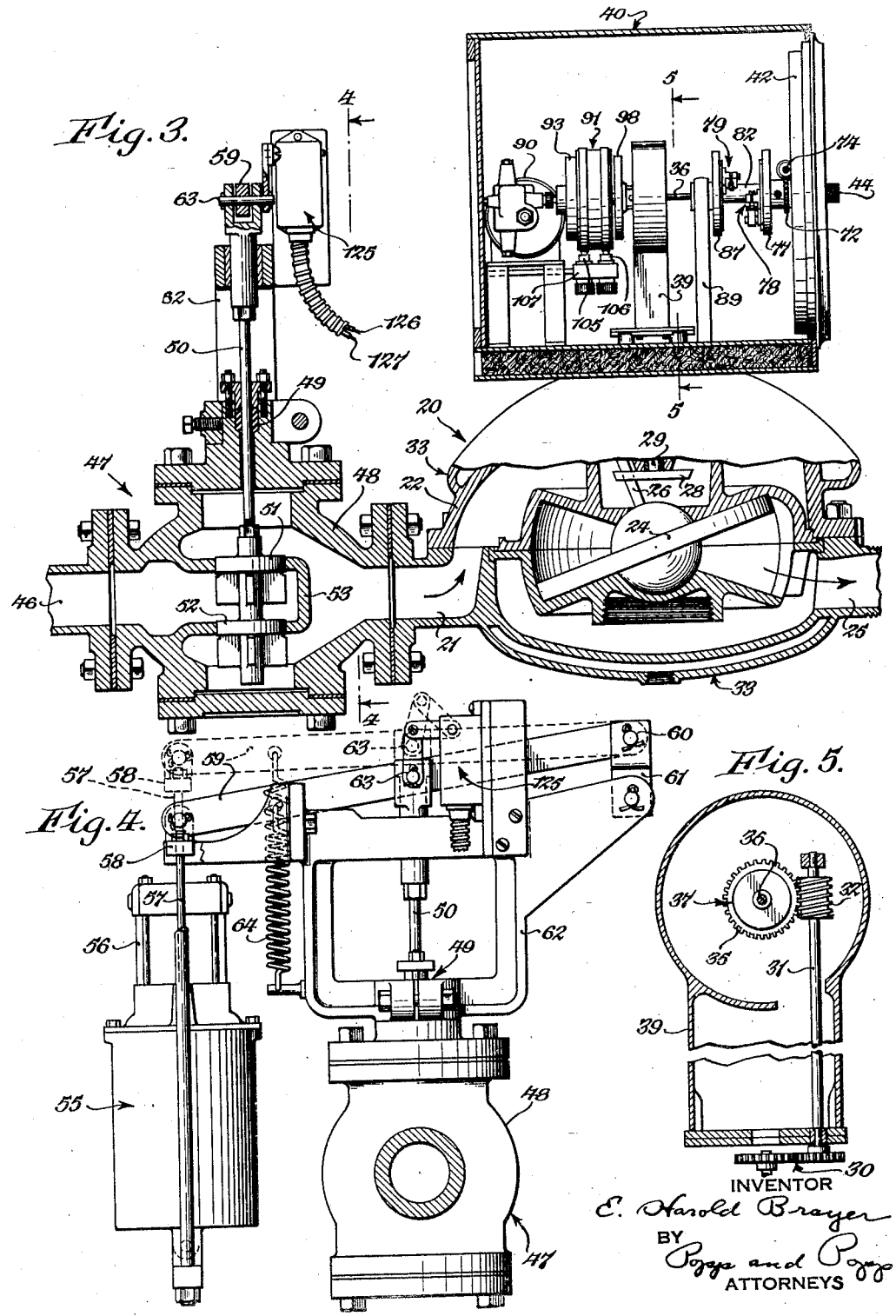
INVENTOR
E. Harold Brayer
BY
Pogys and Pogys
ATTORNEYS June 22, 1937.  E. H. BRAYER  2,084,317
METER
Filed May 2, 1934  4 Sheets-Sheet 4

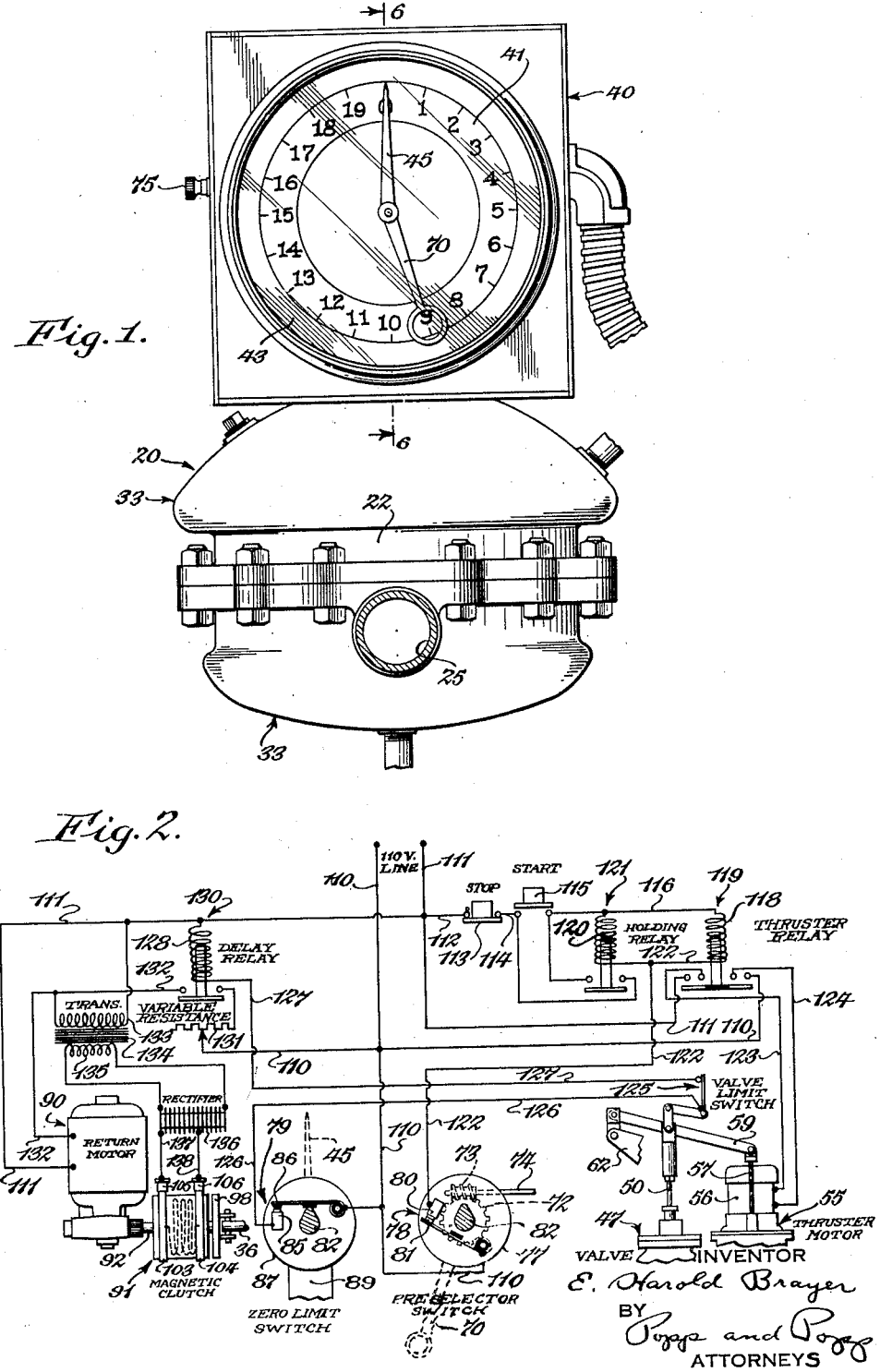

INVENTOR
E. Harold Brayer
BY
Pope & Pope
ATTORNEYS

Patented June 22, 1937

2,084,317

UNITED STATES PATENT OFFICE 2,084,317

METER

Edward Harold Brayer, Buffalo, N. Y., assignor to Brayer Brothers Construction Corporation, Buffalo, N. Y., a corporation of New York Application May 2, 1934, Serial No. 723,536

14 Claims. (Cl. 221—101)

This invention relates to a meter and more particularly to a liquid metering system in which the operator sets the mechanism to deliver a definite quantity of liquid and in which, after this quantity of liquid has been delivered, the mechanism automatically stops the flow and resets itself to its original position. The meter shown is primarily designed for use in mixing hot asphalt compounds which has heretofore been done by a bucket and scale, the bucket being filled, weighed and discharged. This operation was extremely hazardous to the operator, required a great deal of manual labor and was not accurate, all of which objections are eliminated by the present invention.

The invention, however, is not to be limited to the particular field mentioned but has a wide range of uses, for example, in gasoline and oil service stations where it would enable the operator to take care of a number of pumps since after the operator sets the pump to the desired gallonage, the delivery of the fuel or oil and the resetting of the mechanism is automatic. Further, the invention could be readily adapted to self-service gasoline or oil pumps by the addition of a coin-controlled mechanism whereby a retail user could insert, say, fifty cents, and receive exactly the quantity of gasoline or oil to which he is entitled. The invention also has a wide range of other uses, such as in filling containers with a definite volume of liquid and by the addition of further well known automatic mechanism, such as photoelectric cells or timing mechanisms could be adapted to continuously fill containers on a moving belt with definite volumes of liquid. The invention can also be employed in connection with the blending of oils, gasolines, kerosenes, lubricants and other commodities in a fluid state, blending being readily accomplished by having one or more systems made in accordance with the invention and delivering to a common discharge.

The principal object of the invention is to provide a simple, reliable and accurate liquid meter which includes a preselector hand which can be set to any desired volume indication and which also includes means for automatically stopping the flow of liquid when the exact volume of fluid indicated by the preselector hand has been delivered and means for automatically resetting the meter indicating mechanism to zero after the preselected volume has been delivered.

Another object of the present invention is to provide a suitable clutch, whereby the metering operation does not involve the unnecessary operation of auxiliary equipment, which operation might result in inaccuracy and another clutch whereby the main indicating hand can be reset without operating its metering mechanism.

A further aim of the present invention is to provide such a system in which parts of standard construction, such as the meter, the valve and the valve thruster, can be employed, thereby enabling the system to be installed at relatively low cost.

Another object of the invention is to provide an automatic metering system of the character described which is compact in construction and is composed of relatively few moving parts and will operate efficiently to deliver accurately predetermined quantities of liquid for a long period of time without getting out of order and requiring repairs.

Another object of the invention is to provide such a metering system which is conveniently adjustable throughout and in which, in particular, the electrical contacts can be readily adjusted to obtain the most accurate measurement.

Another object of the present invention is to provide such a metering device which can be adapted to any of the uses previously mentioned and in particular to use in mixing hot asphalt compounds or the like in which the meter and valve mechanisms must be steam jacketed to insure uniformity and accuracy in the measurement.

Another object is to provide a system which can be operated from any suitable current source and in which the speed of the resetting mechanism can be conveniently adjusted to that desired.

In the accompanying drawings:

Fig. 1 is a front elevation of a meter embodying my invention showing a dial which is calibrated in, say, gallons having a standard indicating hand and also a preselector hand, the preselector hand being set to the volume desired to be measured out.

Fig. 2 is a wiring diagram of the electric power and control system.

Fig. 3 is a vertical central section through the metering mechanism shown in Fig. 1, parts being shown in elevation.

Fig. 4 is a vertical transverse section taken on line 4—4, Fig. 3.

Fig. 5 is a vertical transverse fragmentary section taken on line 5—5, Fig. 3.

Figure 6:
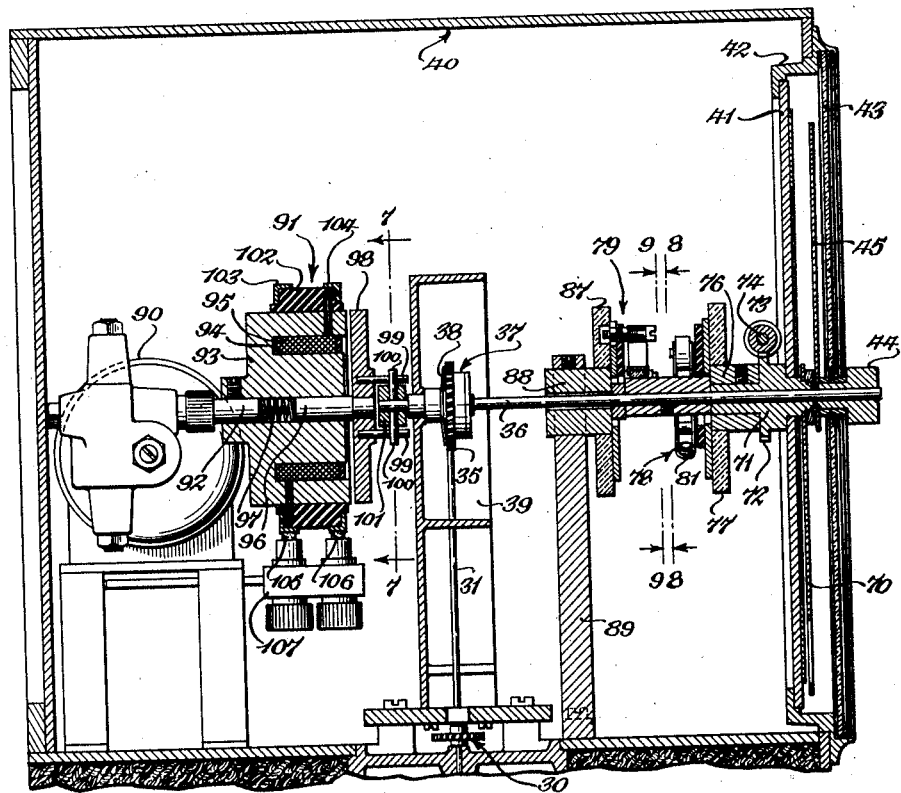
Fig. 6 is a vertical fragmentary longitudinal section taken on line 6—6, Fig. 1.
Figure 7:
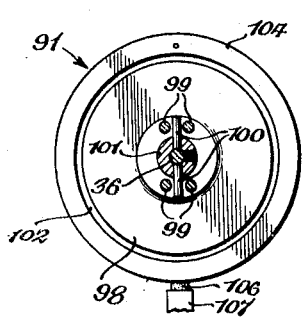
Figure 8:
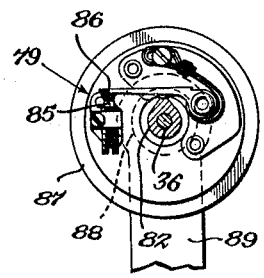
Figure 9:
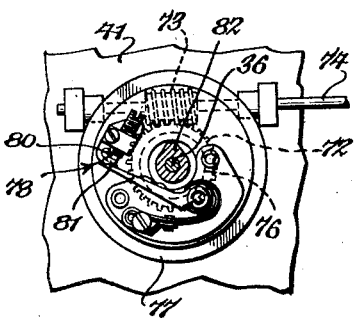

Figs. 7, 8, and 9 are fragmentary transverse sections taken on the correspondingly numbered lines of Fig. 6.

Figure 10:
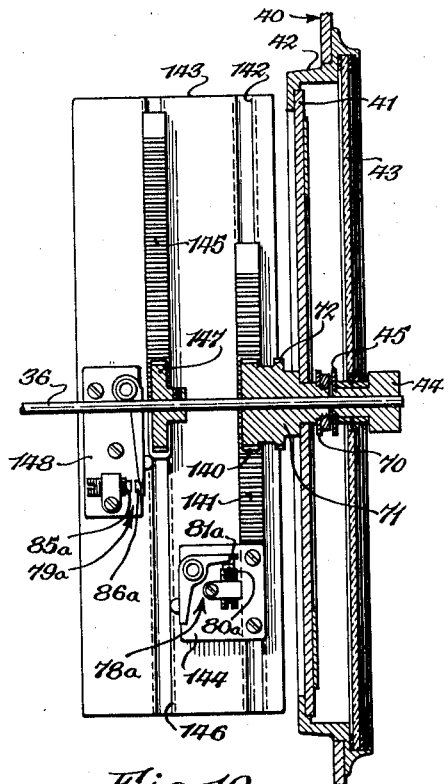

Fig. 10 is a horizontal fragmentary central section showing a modified form of the electrical means for setting and resetting the mechanism.

Figure 11:
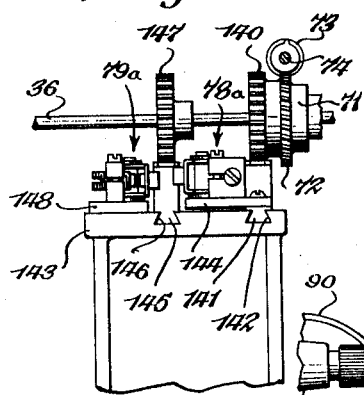

Fig. 11 is a side view of the mechanism shown in Fig. 10, showing the preselector rod in section.

Figures 12, 13:
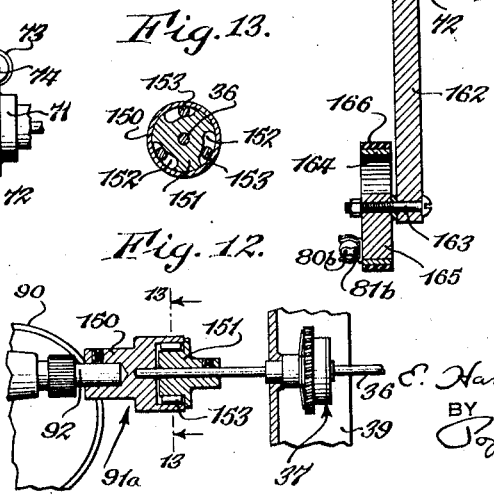

Fig. 12 is a fragmentary transverse section through a one-way drive which can be used in place of the magnetic clutch shown in the preferred form of the invention.

Fig. 13 is a section taken along line 13—13, Fig. 12.

Figures 14, 15, 16:
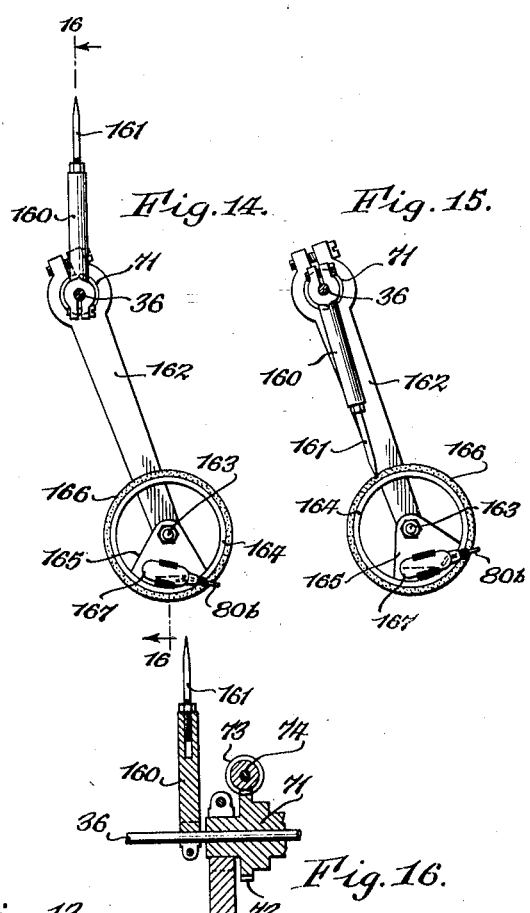

Fig. 14 is a fragmentary vertical section similar to the section taken along line 9—9, Fig. 6, but showing a modified form of preselector mechanism.

Fig. 15 is a view similar to Fig. 14 showing another position of the parts.

Fig. 16 is a section taken along line 16—16, Fig. 14.

The invention proposes the use of a meter of any suitable construction for the material handled and the meter 20 shown in the drawings is of the standard nutating disk type, the liquid material flowing through an inlet 21 of the meter casing 22 past the nutating disk 24 and out through an outlet 25 from which the materials are conveyed to the place desired. The nutating disk 24 nutates in accordance with the quantity of liquid passing and a stem 26 thereon turns a disk 28, the stem 27 projecting through a slot in the disk 28 for this purpose. This disk 28 is fast to a vertical shaft 29 which, through suitable reduction gearing (not shown), and gearing 30 drives a vertical worm shaft 31 carrying a worm 32. Where the materials are normally in a solid or highly viscous state the casing 22 for the nutating metering disk is jacketed as indicated at 33, steam being admitted to this jacket so as to maintain the fluid handled at a high temperature and in a state of fluidity.

The worm 32 (Fig. 5) drives a worm wheel 35 which is loose on a horizontal indicator shaft 36 and drives this shaft through a friction clutch 37, yielding pressure being exerted against this friction clutch by a spring 38. This shaft is mounted at one end in a bearing formed in a bracket 39 and is arranged within a casing 40. At its other end this shaft 36 projects through the face of a dial 41, this dial having an annular series of numbers which are shown as graduated from 1 to 20 and are assumed to indicate gallons. The dial 41 is suitably mounted within an annular rim 42 and this rim is screwed or otherwise suitably secured in a circular opening in the corresponding end wall of the casing 40. The annular rim 42 also carries a crystal 43, and the shaft 36 extends through a central opening in the crystal 43 and at its outwardly projecting end preferably carries a knurled knob 44 by means of which the shaft 36 can be turned by hand in the event of the failure of the motor to return the same as hereinafter described. The shaft 36 carries an indicator hand 45, this hand being preferably mounted on the hub of the knob 44 and indicating the volume of fluid which is registered by the nutating disk 24.

The fluid is supplied to the meter under pressure from a fluid supply pipe 46 and the flow of this fluid is controlled by a balanced valve indicated generally at 47 which may be located either ahead or behind the meter, that is, controlling the flow of fluid to the meter or controlling the flow of fluid from the meter. The balanced valve 47 can be of any usual construction and as shown comprises a housing 48 which is shown as secured to the supply pipe 46 and to the inlet 21 of the meter 20 and this housing can, of course, be steam jacketed where extremely viscous materials are being handled and it is necessary to keep them heated, under which conditions all of the piping would also be jacketed. The valve casing 48 is shown as having the usual stuffing box 49 through which the valve stem 50 slides vertically. This valve stem carries a pair of heads 51 and 52 which open and close a pair of ports in an internal diaphragm 53 which extends across the interior of the valve housing. Suitable guides are provided for each of the valve heads and by the provision of the two valve heads, as shown, the valve is balanced, that is, there is no tendency for the pressure of the fluid to either open or close the valve inasmuch as the force of this pressure is balanced by its opposing effect upon the two valve heads. The valve is opened and closed by means of a motor driven thruster indicated generally at 55, this thruster being of conventional construction and hence not being illustrated in detail. When the motor 56 of the thruster is energized, upward motion is imparted to a pair of push rods 57, these rods being connected by a cross bar 58. This cross bar is secured to one end of a lever 59, the other end of this lever being pivoted, as indicated at 60, to the upper end of a link 61, this link being in turn pivoted to a stationary bracket 62 mounted on the valve housing 48. Intermediate its ends the lever 59 is pivotally secured, as indicated at 63, to the upper end of the valve rod 50. The valve is normally held closed by a tension spring 64 which is connected at one end to the outer end of the lever 59 and at its other end is secured to the bracket 62. It is therefore apparent that when the motor of the thruster is energized the lever 59 will be lifted and the balanced valve opened so as to admit fluid under pressure through the meter. Conversely, when the thruster motor is deenergized the spring 64 will draw the lever 59 downwardly thereby closing the valve and also returning the thrusher to its normal inoperative condition.

Means are provided for preselecting the volume of fluid to be delivered by the meter and for this purpose a preselector hand 70 is provided which traverses the dial 41 and is set to the amount which it is desired to have the meter deliver. For this purpose the preselector hand 70 is fast to a hub 71 which is journalled in the dial 41 and is loose upon the indicator shaft 36. Formed integrally with the hub 71 is a worm wheel 72, this worm wheel being driven by a worm 73 fast upon a horizontal preselector shaft 74 which is suitably journalled in the casing 40. This shaft 74 extends through the side of the casing 40 and is provided exteriorly of the casing with a knob 75 by means of which the preselector shaft is turned to set the preselector hand 70 to the volume desired.

Mounted on the hub 71 of the preselector mechanism is a collar 76 which carries a disk 77 of insulating material, this disk carrying a preselector switch 78 comprising a stationary contact 80 and a movable contact 81, the movable contact 81 being engaged by a cam 82 which is fast to the indicating shaft 36 so that as the indicating shaft turns a partial revolution, it opens and closes the circuit between the movable and stationary contacts 80 and 81. In the normal condition of the parts these preselector contacts 80 and 81 are normally closed as indicated in the wiring diagram, Fig. 2.

Also actuated by the cam 82 is a fixed zero limit switch 79 comprising a pair of contacts 85 and 86, the stationary contact 85 being mounted on a disk 87 of insulating material and the movable contact 86 also being mounted on this disk. The disk is carried by a sleeve 88 through which the indicator shaft 36 extends and this sleeve 88 in turn is carried by a bracket or standard 89 secured to the bottom of the casing 40. The movable and stationary contacts 80 and 81 are normally closed, as shown in Fig. 9, and when the salient part of the cam 82 engages the movable contact it opens the circuit associated with these contacts. It is therefore apparent that when the salient part of the cam 82 engages either the movable contact 81 or the movable contact 86, it opens the corresponding circuit but since in the zero position of the indicator hand 45 the salient portion of the cam is in engagement with the movable contact 86, this contact is normally open whereas the other is normally closed except when the preselector hand 70 is also set to a zero position.

Means are provided for automatically returning the indicator hand 45 to a zero position after the preselected volume of fluid has been delivered. Thus, the indicator hand 45 will travel clockwise registering the volume being discharged by the meter until it registers with the preselector hand 70. When this occurs, as hereinafter discussed, the flow is cut off and, in the forms of the invention shown in Figs. 1–9, the indicator hand 45 is returned back to zero in a counter-clockwise direction by a small electric return motor 90, this motor being normally disengaged from the indicator shaft 36 through a magnetic clutch indicated generally at 91. The motor is mounted within the casing 40 and through the usual gearing drives a shaft 92 which is connected to the driving member 93 of the magnetic clutch 91. This driving member 93 has an annular slot 94 in which a coil 95 is wound, this driving member 93 forming the core of the magnetic clutch. The driving member 93 is provided with a bore in which a pin 96 is slidably mounted and normally urged outwardly by a small compression spring 97. This pin carries the driven member 98 of the magnetic clutch, this being in the form of an iron or steel disk forming the armature of the magnetic clutch. The armature 98 and the pin 96 are free to rotate with respect to the driving member or core 93 of the clutch. The armature 98 carries two pairs of pins 99 which embrace a pair of transverse pins 100 in a collar 101 in the inner end of the indicator shaft 36.

Any suitable means can be provided for energizing the clutch and as shown the core 93 carries a ring 102 of insulating material, this ring in turn carrying a pair of collector rings 103 and 104, these rings being respectively connected to the opposite ends of the winding 95 of the core and being engaged by a pair of stationary brushes 105 and 106 mounted in a brush holder 107.

As hereinafter described the motor 90 and the magnetic clutch 91 are simultaneously energized so that the motor through the magnetic clutch 91 will drive the indicator shaft 36 counter-clockwise and thereby return the indicator hand 45 to zero. When the indicator hand reaches its zero position additional means are provided for deenergizing the motor 90 and the magnetic clutch 91.

Referring now to the wiring diagram shown in Fig. 2, the numerals 110 and 111 represent the power lines through which alternating current, at say 110 volts, is supplied. From the power line 111 is a line 112 leading to a manual stop button 113 which in its normal or closed position makes contact with the line 112 and the line 114. A start button 115 is also provided which, when depressed, closes the circuit between the line 114 and a line 116. The line 116 connects with the winding 118 of a relay 119 and also with a winding 120 of a holding relay 121. The other ends of the windings 118 and 120 are commoned and connected with a line 122, this line 122 connecting with the contact 80 of the preselector switch 78 which is normally closed. The other contact 81 of this preselector switch connects with the main line 110.

When the relay 119 is energized its armature connects the windings of the thruster motor 56 with the opposite sides of the power lines 110 and 111, through the lines 123 and 124 which are connected with thruster motor terminals.

The holding relay 121 is designed to continue the flow of current to the thruster motor after the start button 115 is released and for this purpose its armature, in the energized condition of the relay connects the line 116 with the line 114, and maintains the circuit across the released start button 115.

When the thruster motor 56 is energized, raising the link 59, it opens a normally closed valve limit switch 125, this valve limit switch being closed when the control valve 47 is closed and opened when this valve is opened. This switch connects two lines 126 and 127 the line 126 connecting with the contact 85 of the zero limit switch 79, the other contact 86 of this switch being connected directly to the main power line 110. The other line 127 from the switch 125 connects with the winding 128 of a delay relay 130, the other end of this winding being connected with the main power line 111. The armature of the delay relay 130, in the energized condition of the relay, closes a circuit between the main power line 110, a variable resistance 131 and a line 132 leading to one terminal of the indicator hand return motor 90, the other terminal of this motor being connected with the main power line 111. The primary winding 133 of a step-down transformer 134 is connected across the lines 132 and the main power line 111 and the secondary winding 135 of this transformer 134 provides low voltage current to a rectifier 136, this rectifier being preferably of the dry disk type and either of the half-wave or full-wave type. The outlet lines 137 and 138 of the rectifier 136 connect with the two brushes 105 and 106 of the magnetic clutch 91. The purpose of the rectifier 136 is, of course, to furnish direct current to the magnetic clutch 91.

Assuming that it is desired to have the meter deliver, say, 9 gallons of material the operator turns the preselector knob 75 to set the preselector hand 70 at the numeral 9 on the dial 41. This is effected through the shaft 74 and worm and worm gear 73 and 72. The setting of the preselector hand 70 in this manner also sets the preselector contacts 80 and 81 inasmuch as these are mounted on the disk 77 which is carried directly by the hub 71 of the worm wheel 72. This preselector pointer, once set, only requires manual resetting if some other quantity is desired and need never be changed unless different amounts are to be measured. Normally the indicator hand 45 is at zero and in this condition the zero limit switch contacts 85 and 86 are opened and when the preselector hand 70 is in any position other than zero the preselector contacts 80 and 81 are closed.

To start the mechanism the starting button 115 is depressed and this permits current to flow from the power line 111 through the holding relay 121 and the relay 119 and thence through the line 122, closed contacts 80 and 81 of the preselector switch and back through the other side 110 of the main power line. The energization of the holding relay 121 closes the circuit across the starting switch 115 so that the circuit just described is maintained until broken by the opening of the contacts 80 and 81 of the preselector switch or the stop button 113. The energization of the relay 119 causes current to flow from the side 111 of the power line through line 123, thruster motor 56 and line 124 to the other side 110 of the main power line, thereby starting the thruster motor. The energization of the thruster motor causes its push rods 57 to move upwardly thereby lifting the outer end of the lever 59 and lifting the valve stem 50 carried thereby, thereby opening the balanced valve 47 and permitting the liquid, under pressure, to flow through this valve and through the meter 20, the quantity being registered by the nutating disk 24 in the meter. At the same time the valve limit switch 125 is opened by the rising movement of the lever 59.

The nutating movement of the metering disk 24, through the vertical shaft 31 and the worm gearing 32 and 35 associated therewith, rotates the indicator shaft 36 which carries the cam 82. As soon as the cam 82 starts to rotate the contacts 85 and 86 of the zero limit switch close, no current, however, flowing because the valve limit switch 125 has opened.

The meter therefore continues to deliver material and the indicator shaft 36 of the meter turns a part revolution until the indicator hand 45 comes into registry with the preselector hand 70.

Since the setting of the preselector hand 70 also sets the disk 77 carrying the preselector switch contacts 80 and 81 to a corresponding position, when the indicator hand 45 registers with the preselector hand 70, the cam 82 engages the preselector contact 81 and opens the switch.

This breaks the circuit through the holding relay 121 and the relay 119 thereby breaking the circuit through the thruster motor 56. When the thruster motor is deenergized the spring 64 draws the lever 59 downwardly thereby closing the main valve 47 and cutting off the further flow of liquid through the meter. At the same time the closing of the main valve 47 closes the valve limit switch 125 and a circuit is established from the side 110 of the line through the now closed contacts 85 and 86 of the zero limit switch, line 126, closed valve limit switch 125, line 127, delay relay winding 128 to the side 111 of the power line. The action of the delay relay 130 provides a lapse of, say, two and one-half seconds between the time of its initial energization and the time in which its armature closes a circuit which permits current to flow from the side 110 of the main power line through the variable resistance, 131, through the contacts of the delay relay 130 and through line 132 to the indicator hand return motor 90, the other terminal of this motor being directly connected with the side 111 of the main power line. The variable resistance 131 is provided to vary the speed of the return motor 90 in returning the indicator hand 45 to its zero position and the purpose of the delay relay 130 is to provide a lapse in time before the indicator hand 45 starts its return movement so that all parts of the metering apparatus can return to their normal position before the indicator hand starts its return movement.

Concurrent with the energization of the starting motor the magnetic clutch 91 is also energized, current being supplied to the primary winding 133 of the step-down transformer 134 across the lines 111 and 132 and the current from the secondary winding 135 being rectified in the rectifier 136 before being delivered to the collector rings 103 and 104 of the coil 95 of the magnetic clutch. As soon as the magnetic clutch is energized its armature 98 is drawn into engagement with its core 93 against the resistance of the spring 97 and a friction drive is thereby provided between the motor 90 and the indicator shaft 36. Since the motor 90 is energized this motor drives the indicator shaft and the drive is such that the indicator hand 70 is driven in a counter-clockwise direction. As soon as the indicator hand 70 reaches its zero position the cam 82 on the indicator shaft lifts the movable contact 86 of the zero limit switch thereby breaking the circuit through the power line 111, winding 128 of the delay relay 130, line 127, valve limit switch 125, line 126, contacts 85 and 86 to the other side 110 of the line, thereby causing the delay relay to open the circuit through the return motor 90 and the magnetic clutch 91 and returning these parts to their normal inoperative condition, as shown in Fig. 2. The parts are therefore in their normal positions and ready for the repetition of the cycle.

It will also be observed that the stop switch 113 provides a safety feature inasmuch as the operation of the meter can be stopped at will, at any time, by merely depressing this switch and the whole apparatus returned to its original normal condition including the return of the metering hand to its zero position. At the same time this switch also permits of manual control of the meter without altering the adjustment of the preselector hand.

It is obvious that various features of the invention are susceptible of modification. For example, in place of the rotatable preselector switch 78 and the fixed zero limit switch 79, sliding cam switches could be employed. Such a modification is illustrated in Figs. 10 and 11 in which the hub 71 of the preselector worm wheel 72 is formed to provide an additional gear 140 which meshes with and drives a rack 141. This rack is slidably mounted in a guideway 142 of a support 143 in the casing 40 and at its lower end carries a plate 144 of insulating material on which the fixed and movable contacts 80a and 81a of a preselector switch 78a are mounted, these contacts corresponding to the contacts 80 and 81 in the preferred form of the invention. The movable contact 81a carries a cam projection which extends into the path of a second rack 145, this rack being also guided in a guideway 146 in the support 143 and being driven from the indicator shaft 36 by a gear 147. Also mounted on an insulating block 148 carried by the support 143 are fixed and movable contacts 85a and 86a of a zero limit switch 79a, these contacts corresponding to the contacts 85 and 86 in the preferred construction and the movable contact 86a having a projection which extends into the path of the lower end of the rack 145. It is apparent that when the indicator shaft 36 starts to turn from its zero position its rack 145 will first close the zero limit switch contacts 85a and 86a in the same manner as the zero limit switch contacts 85 and 86 are closed in the preferred construction and thereafter open the preselector contacts 80a and 81a in the same manner as the preselector switch contacts 80 and 81 are opened in the preferred construction. Inasmuch as the adjustment of the preselector hand also adjusts the relative spacing of the preselector switch 78a and the zero limit switch 79a the amount of liquid delivered is regulated in the same manner as in the preferred construction.

Instead of employing the magnetic clutch 91 it is apparent that a one-way mechanical clutch 91a of the free wheeling type could be employed. In Figs. 12 and 13 is illustrated a free wheeling clutch in which the driving member 150 is secured to the motor shaft 92 and has an annular end pocket into which the driven member 151 fits, the driven member being secured to the shaft 36. The driven member has the usual series of pockets 152, inner faces of which are arranged tangentially to the outer face of the driven member and these pockets contain the rollers 153. When the indicator shaft 36 is being rotated so as to move the indicator 45 clockwise no drive is established between the driven and driving members of the free wheeling clutch 91a because the rollers 153 are carried to the deeper parts of the pockets 152 and become inoperative. As soon as the return motor 90 is energized the driving member 150 is rotated so that the rollers roll outwardly and establish a drive between the driving and driven members whereby the return motor moves the indicator hand back to the zero position. With this arrangement the indicator hand is moved continuously in a clockwise direction, that is, it is moved clockwise up to its point of registry with the preselector hand 70 and after pausing moves in the same direction back to its zero starting point.

In Figs. 14, 15 and 16 is illustrated another modification of the means for adjusting the mechanism so as to stop the flow when a predetermined volume has been delivered. In this construction an arm 160 is fast to the indicator shaft 36, this arm having a removable pointed pin 161 projecting outwardly therefrom. The preselector adjusting mechanism includes the shaft 74 and worm and worm wheel driving the hub 71, as in the preferred construction and on the hub 71 is clamped an arm 162 having a pivot bolt 163 journalled at its outer end. Fixed to this pivot bolt is a wheel 164 which is weighted at one side, as indicated at 165, so as to normally assume the position shown in Fig. 14. This wheel has a peripheral belt of rubber 166 and the wheel carries a mercoid switch 167 which is normally closed. The mercoid switch 167 has two contacts 80b and 81b which correspond to the contacts 80 and 81 of the preferred construction. With this modified form of the invention the arm 162 and the preselector arm 70 on the same hub are set to a predetermined volume on the dial 41 and upon depressing the start button 115 the pointed arm 160 will travel around until its point digs into the rubber periphery of the wheel 164. When this occurs the wheel 164 is turned out of balance so that the mercoid switch 167 is opened, this occurring when the indicator arm 45 comes into registry with the preselector arm 70. It is apparent that this form of the invention will perform the same function as the preselector switch 78 of the preferred form of the invention.

From the foregoing it is apparent that the present invention and the different modified forms thereof provide an extremely simple, compact, inexpensive and accurate meter in which the amount to be delivered can be preselected and which will deliver the preselected volume of the fluid and automatically restore the parts to their original normal condition. The meter is particularly adapted to handle hot materials, such as in the mixing or blending of asphalt, oil and the like. It will further be observed that the accuracy of the meter is insured by disconnecting all mechanism not immediately concerned with the particular functioning of the mechanism at any particular time.

I claim as my invention:

1. In a fluid metering system of the character described, metering means, an electrically actuated valve for stopping the flow of liquid through said metering means, a shaft driven by said metering means, a freely rotatable member arranged concentric with said shaft, manual means for turning said rotatable member, a switch in circuit with said electrically operated valve and carried by said rotatable member and a cam carried by said shaft and actuating said switch when a predetermined relation obtains between said shaft and rotatable member.

2. In a fluid metering system of the character described, metering means, an electrically actuated valve for stopping the flow of fluid through said metering means, a calibrated member, an indicator shaft driven by said metering means, an indicator hand carried by said shaft and traversing said calibrated member and indicating the volume of fluid being delivered, a rotatable member on said shaft adjacent said hand the rotation of said rotatable member being independent of the rotation of said shaft, a preselector hand carried by said rotatable member and traversing said calibrated member and adapted to be set to the calibration of the desired volume, manual means for turning said rotatable member and preselector hand to any position along said calibrated member, a switch in circuit with said electrically actuated valve and carried by said rotatable member and a cam on said shaft and actuating said switch when a predetermined relation obtains between said shaft and rotatable member.

3. In a fluid metering system of the character described, metering means, an electrically actuated valve for stopping the flow of fluid through said metering means, a shaft driven by said metering means, a freely rotatable member arranged concentric with said shaft, manual means for turning said freely rotatable member, a weighted member pivotally secured to said freely rotatable member and normally held in an upright position by its weight, a mercury switch mounted on said weighted member and arranged in circuit with said electrically actuated valve and means carried by said shaft for unbalancing said weighted member when a predetermined relation obtains between said shaft and said freely rotatable member.

4. In a fluid metering system of the character described, metering means, an electrically actuated valve for stopping the flow of fluid through said metering means, a calibrated member, an indicator shaft concentric with said member and driven by said metering means, an indicator hand carried by said shaft and traversing said calibrated member, a freely rotatable member on said shaft adjacent said hand, a preselector hand carried by said rotatable member and traversing said calibrated member, manual means for turning said rotatable member and preselector hand to any position along said dial, an arm carried by said freely rotatable member, a weighted member pivotally secured to the outer end of said arm and movably held upright by said weight in all positions of said arm, a mercury switch mounted on said weighted member and in circuit with said electrically actuated valve and a finger carried by said shaft and engaging said weighted member when a predetermined relation obtains between said shaft and rotatable member to disturb its balance and actuate the mercury switch.

5. In a fluid metering system of the character described, metering means, an electrically actuated valve for stopping the flow of fluid through said metering means, a shaft driven by said metering means, a pinion carried by said shaft, a rack driven by said pinion, a freely rotatable member arranged concentric with said shaft, manual means for turning said freely rotatable member, a pinion carried by said freely rotatable member, a rack driven by said last pinion, and cooperating trip and switch means carried by said racks to actuate said valve when a predetermined relation obtains between said shaft and freely rotatable member.

6. In a fluid metering system of the character described, metering means, an electrically actuated valve for stopping the flow of fluid through said metering means, a calibrated member, an indicator shaft driven by said metering means, an indicator hand carried by said shaft and traversing said calibrated member, a freely rotatable member on said shaft adjacent said hand, a preselector hand carried by said rotatable member and traversing said calibrated member, manual means for turning said rotatable member and preselector hand to any position along said calibrated member, a pinion carried by said shaft, a rock driven by said pinion, a second pinion carried by said freely rotatable member, a second rack driven by said second pinion, a switch carried by one of said racks and in circuit with said electrically actuated valve and a trip carried by the other rack and actuating said switch when a predetermined relation obtains between said shaft and freely rotatable member.

7. In a fluid metering system of the character described, metering means, an electrically actuated valve for stopping the flow of fluid through said metering means, a switch in circuit with said electrically actuated valve, a calibrated member, an indicator shaft, means for driving said indicator shaft from said metering means, an indicator hand driven by said shaft and traversing said calibrated member and indicating the volume of fluid being delivered, a rotatable member arranged concentric with said shaft, the rotation of said rotatable member being independent of the rotation of said shaft. A preselector hand connected with said rotatable member and traversing said calibrated member and adapted to be set to the calibration of the desired volume, manual means for turning said preselector hand and rotatable member to any position along said calibrated member, cooperating means carried by said rotatable member and shaft and operating to be actuated by said shaft when said hands come into register, an indicator hand return motor, a clutch between said motor and shaft and means actuated by the said cooperating means for simultaneously energizing said motor and closing said clutch when said valve closes.

8. In a fluid metering system of the character described, metering means, an electrically actuated valve for stopping the flow of fluid through said metering means, a switch in circuit with said electrically actuated valve, a calibrated member, an indicator shaft, means for driving said indicator shaft from said metering means, an indicator hand driven by said shaft and traversing said calibrated member and indicating the volume of fluid being delivered, a rotatable member arranged concentric with said shaft the rotation of said rotatable member being independent of the rotation of said shaft, a preselector hand connected with said rotatable member and traversing said calibrated member and adapted to be set to the calibration of the desired volume, manual means for turning said preselector hand and rotatable member to any position along said calibrated member, cooperating means carried by said rotatable member and shaft and operating to be actuated by said shaft when said hands come into register, an indicator hand return motor, a clutch between said motor and shaft, means actuated by the said cooperating means for simultaneously energizing said motor and closing said clutch when said valve closes, and means actuated by said shaft for deenergizing said motor and opening said clutch when said indicator hand reaches a zero position on said calibrated member.

9. In a fluid metering system of the character described, metering means, an electrically actuated valve for stopping the flow of fluid through said metering means, a switch in circuit with said electrically actuated valve, a shaft driven by said metering means, a rotatable member arranged concentric with said shaft the rotation of said rotatable member being independent of the rotation of said shaft, manual means for turning said rotatable member, cooperating means carried by said rotatable member and shaft and operating to actuate said switch when a predetermined relation obtains between said shaft and said rotatable member, a motor for returning said shaft to its original position, a clutch between said motor and shaft, a switch actuated by said cooperating means for energizing said motor and closing said clutch when said valve closes, a switch in series with said last switch for deenergizing said motor, and means actuated by said shaft for opening said last switch and deenergizing said motor when said shaft is returned to its original position.

10. In a fluid metering system of the character described, metering means, an electrically actuated valve for stopping the flow of fluid through said metering means, a switch in circuit with said electrically actuated valve, a shaft driven by said metering means, a rotatable member arranged concentric with said shaft the rotation of said rotatable member being independent of the rotation of said shaft, manual means for turning said rotatable member, cooperating means carried by said rotatable member and shaft and operating to actuate said switch when a predetermined relation obtains between said shaft and said rotatable member, a motor for returning said shaft to its original position, an electromagnetic clutch between said motor and shaft and closing when energized, a switch actuated by said cooperating means for energizing said motor and clutch when said valve closes, a switch in series with said last named switch for deenergizing said motor and clutch and means actuated by said shaft for opening said last switch and deenergizing said motor and clutch when said shaft is returned to its original position.

11. In a fluid metering system of the character described, metering means, an electrically actuated valve for stopping the flow of fluid through said metering means, a switch in circuit with said electrically actuated valve, a shaft driven by said metering means, a rotatable member arranged concentric with said shaft the rotation of said rotatable member being independent of the rotation of said shaft, manual means for turning said rotatable member, cooperating means carried by said rotatable member and shaft and operating to actuate said switch when a predetermined relation obtains between said shaft and said rotatable member, a motor for returning said shaft to its original position, a one-way clutch between said motor and shaft, said shaft closing when said motor is energized, a switch actuated by said cooperating means for energizing said motor when said valve closes, a switch in series with said last named switch for deenergizing said motor and means actuated by said shaft for opening said last switch and deenergizing said motor when said shaft is returned to its original position.

12. In a fluid metering system of the character described, metering means, an electrically actuated valve operating, when energized, to start the flow of fluid through said metering means, start switch means in circuit with said electrically actuated valve and closing the circuit therethrough, a preselector switch in series with said start switch means and opening the circuit through said valve when opened, a shaft driven by said metering means, a rotatable member arranged concentric with said shaft the rotation of said rotatable member being independent of the rotation of said shaft, manual means for turning said rotatable member, cooperating means carried by said rotatable member and shaft and operating to open said preselector switch when predetermined relation obtains between said shaft and said rotatable member, a motor for returning said shaft to its original position, a clutch between said motor and shaft, a valve limit switch actuated by said valve for energizing said motor and closing said clutch when said valve closes, a zero limit switch in series with said valve limit switch and opening to break the circuit through said motor and means actuated by said shaft for opening said zero limit switch when said shaft returns to its zero position.

13. In a fluid metering system of the character described, metering means, an electrically actuated valve operating, when energized, to start the flow of fluid through said metering means, a start switch means in circuit with said electrically actuated valve and closing the circuit therethrough, a preselector switch in series with said start switch means and, when opened, opening the circuit through said valve, a shaft driven by said metering means, a rotatable member arranged concentric with said shaft the rotation of said rotatable member being independent of the rotation of said shaft, manual means for turning said rotatable member, cooperating means carried by said rotatable member and shaft and operating to open said preselector switch when a predetermined relation obtains between said rotatable member and shaft, a motor for returning said shaft to its original position, a clutch between said motor and shaft, a valve limit switch in circuit with said motor and opened by the opening movement of said valve and vice-versa, a zero limit switch in series with said valve limit switch and opening to break the circuit through said motor and valve limit switch and cam means on said shaft for closing and opening said preselector and zero limit switches, said cam opening said preselector switch when the predetermined relation obtains between said shaft and rotatable member and opening said zero limit switch when said shaft is returned to its zero setting.

14. In a fluid metering system of the character described, metering means, an electrically actuated valve for stopping the flow of liquid through said metering means, a shaft driven by said metering means, a carrier movably arranged adjacent said shaft, a switch mounted on said carrier and in circuit with said electrically operated valve, a cam carried by said shaft and movable into the path of said switch to open and close the same and means for moving said carrier to different positions with respect to the cam thereby to adjust the relation between the operation of said metering means and the operation of said switch.

E. HAROLD BRAYER.